US010603960B2

(12) United States Patent
Fujita

(10) Patent No.: US 10,603,960 B2
(45) Date of Patent: Mar. 31, 2020

(54) PNEUMATIC TIRE

(71) Applicant: BRIDGESTONE CORPORATION, Tokyo (JP)

(72) Inventor: Shungo Fujita, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 512 days.

(21) Appl. No.: 15/302,677

(22) PCT Filed: Jan. 21, 2015

(86) PCT No.: PCT/JP2015/051557
§ 371 (c)(1),
(2) Date: Oct. 7, 2016

(87) PCT Pub. No.: WO2015/156010
PCT Pub. Date: Oct. 15, 2015

(65) Prior Publication Data
US 2017/0036489 A1 Feb. 9, 2017

(30) Foreign Application Priority Data
Apr. 11, 2014 (JP) ................................ 2014-082095

(51) Int. Cl.
*B60C 11/11* (2006.01)
*B60C 11/117* (2006.01)
(Continued)

(52) U.S. Cl.
CPC ............... *B60C 11/11* (2013.01); *B60C 11/00* (2013.01); *B60C 11/03* (2013.01);
(Continued)

(58) Field of Classification Search
CPC ... B60C 11/0302; B60C 11/032; B60C 11/12; B60C 2011/0346; B60C 2011/0383
See application file for complete search history.

(56) References Cited

U.S. PATENT DOCUMENTS

| | | | |
|---|---|---|---|
| 5,031,680 A * | 7/1991 | Kajikawa | B60C 11/11 152/209.18 |
| 5,435,366 A | 7/1995 | Voigt et al. | |

(Continued)

FOREIGN PATENT DOCUMENTS

| | | |
|---|---|---|
| CN | 101489809 A | 7/2009 |
| CN | 101835636 A | 9/2010 |

(Continued)

OTHER PUBLICATIONS

Machine translation for Japan 2011-148375 (Year: 2018).*
(Continued)

*Primary Examiner* — Steven D Maki
(74) *Attorney, Agent, or Firm* — Oliff PLC

(57) ABSTRACT

A pneumatic tire includes: a zigzag circumferential direction groove that is formed in a tread portion by alternating and continuously formed first inclined portions and second inclined portions, the first inclined portions being inclined with respect to a tire circumferential direction and the second inclined portions being inclined in the opposite direction to the first inclined portions with respect to the tire circumferential direction; first lug grooves that are inclined in the same direction as the first inclined portions with respect to the tire circumferential direction and that merge with the first inclined portions; and second lug grooves that are inclined in the opposite direction to the first inclined portions with respect to the tire circumferential direction and that intersect the first inclined portions.

14 Claims, 1 Drawing Sheet

(51) Int. Cl.
*B60C 11/12* (2006.01)
*B60C 11/00* (2006.01)
*B60C 11/03* (2006.01)

(52) U.S. Cl.
CPC ........ *B60C 11/0302* (2013.01); *B60C 11/032* (2013.01); *B60C 11/12* (2013.01); *B60C 11/1204* (2013.01); *B60C 11/1236* (2013.01); *B60C 2011/0341* (2013.01); *B60C 2011/0346* (2013.01); *B60C 2011/0358* (2013.01); *B60C 2011/0376* (2013.01); *B60C 2011/0383* (2013.01); *B60C 2011/1254* (2013.01)

(56) References Cited

U.S. PATENT DOCUMENTS

| | | |
|---|---|---|
| 2002/0026972 A1 | 3/2002 | Ochi |
| 2003/0111151 A1 | 6/2003 | Masaki |
| 2009/0151833 A1 | 6/2009 | Sakai |
| 2010/0252158 A1 | 10/2010 | Haga |
| 2014/0000776 A1 | 1/2014 | Nakamura |
| 2014/0014246 A1 | 1/2014 | Fujita |
| 2017/0036489 A1 | 2/2017 | Fujita |

FOREIGN PATENT DOCUMENTS

| | | | |
|---|---|---|---|
| CN | 204547898 U | | 8/2015 |
| EP | 2055505 A1 | | 5/2009 |
| EP | 2058144 A1 | | 5/2009 |
| EP | 2202098 A1 | | 6/2010 |
| GB | 1514473 A | * | 6/1978 |
| GB | 1514473 A | | 6/1978 |
| JP | H09-300917 A | | 11/1997 |
| JP | 2764001 B2 | | 6/1998 |
| JP | 2000-108615 A | | 4/2000 |
| JP | 2002-029224 A | | 1/2002 |
| JP | 2003-237318 A | * | 8/2003 |
| JP | 2003-237318 A | | 8/2003 |
| JP | 2004-017739 A | | 1/2004 |
| JP | 4198366 B2 | | 12/2008 |
| JP | 2009-274669 A | | 11/2009 |
| JP | 2011-148375 A | | 8/2011 |
| JP | 2011-148375 A | * | 8/2011 |
| WO | 2009/038131 A1 | | 3/2009 |
| WO | 2012/133334 A1 | | 10/2012 |
| WO | 2014/091790 A1 | | 6/2014 |

OTHER PUBLICATIONS

Machine translation for Japan 2003-237318 (Year: 2018).*
Mar. 14, 2017 Search Report issued in European Patent Application No. 15776522.3.
Apr. 21, 2015 International Search Report issued in International Patent Application No. PCT/JP2015/051557.
Translation of Aug. 2, 2017 Search Report issued in Chinese Patent Application No. 2015101463664.

* cited by examiner

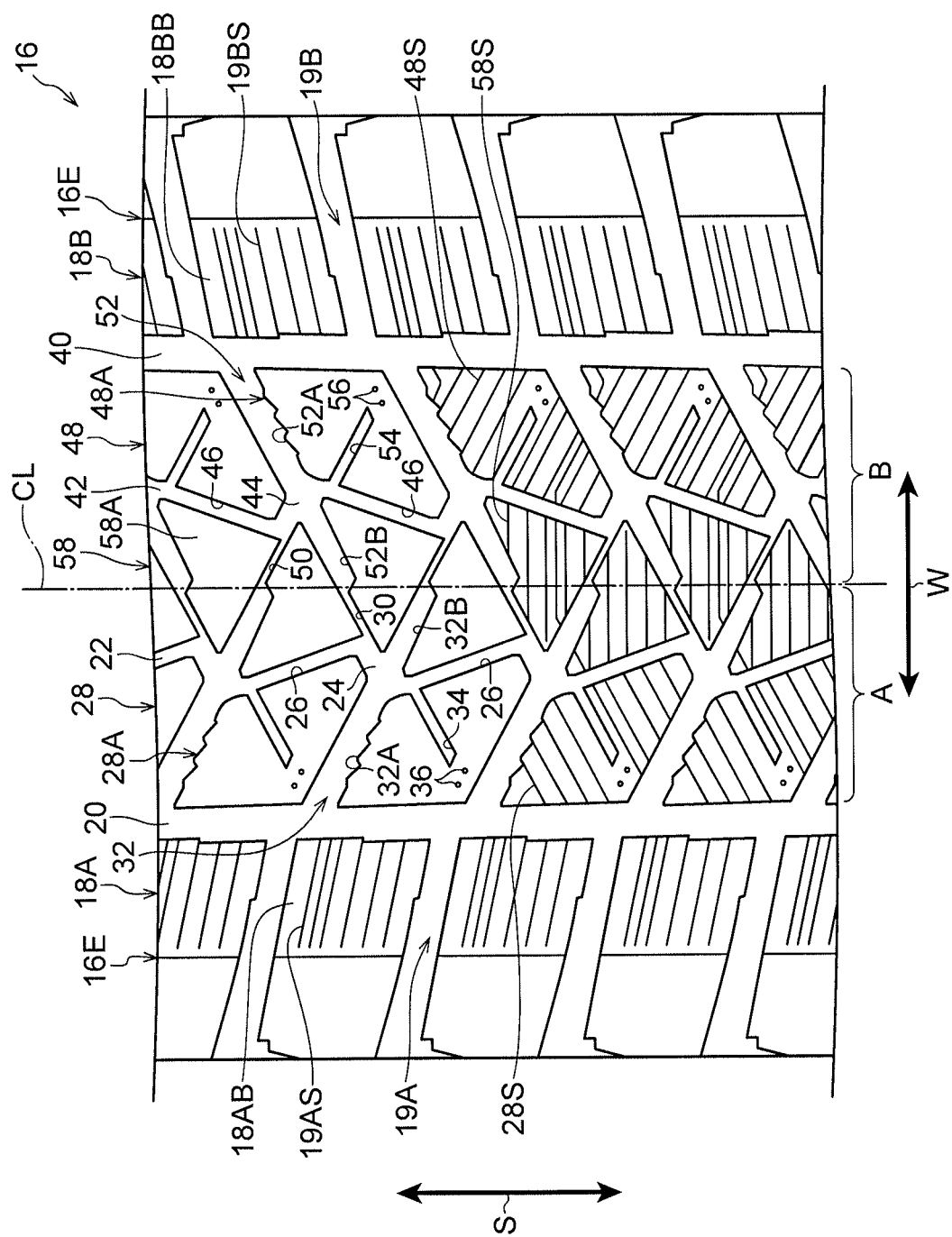

PNEUMATIC TIRE

TECHNICAL FIELD

The present invention relates to a pneumatic tire, and particularly relates to a pneumatic tire with a tread pattern suitable for running on snow.

BACKGROUND ART

Various tread patterns have been proposed hitherto in order to improve tire performance on snow. For example, Japanese Patent No. 2764001 discloses a tread pattern including a zigzag circumferential direction groove and lug grooves opening onto the circumferential direction groove. Generally, lug grooves contribute to ease of braking and acceleration, and circumferential direction grooves contribute to water drainage performance. There is a demand for further improvement in snow performance by devising a combination of such lug grooves and circumferential direction grooves.

SUMMARY OF INVENTION

Technical Problem

In consideration of the above circumstances, an object of the present invention is to provide a pneumatic tire with improved snow performance.

Solution to Problem

A pneumatic tire according to a first aspect of the present invention includes: a zigzag circumferential direction groove that is formed in a tread portion by alternating and continuously formed first inclined portions and second inclined portions, an first inclined portions being inclined with respect to a tire circumferential direction and the second inclined portions being inclined in the opposite direction to the first inclined portions with respect to the tire circumferential direction; first lug grooves that are inclined in the same direction as the first inclined portions with respect to the tire circumferential direction and that merge with the first inclined portions; and second lug grooves that are inclined in the opposite direction to the first inclined portions with respect to the tire circumferential direction and that intersect the first inclined portions.

The first inclined portions are formed in the tread of the pneumatic tire of the present invention. The second inclined portions, the first lug grooves, and the second lug grooves are formed continuously to the first inclined portions. Together with the second inclined portions, the first inclined portions form the zigzag circumferential direction groove, and the respective second inclined portions bend and extend out from one end and another end of each first inclined portion. The first lug grooves are inclined in the same direction as the first inclined portions and merge with the first inclined portions. The second lug grooves are inclined in the opposite direction to the first inclined portions with respect to the tire circumferential direction and intersect the first inclined portions. Namely, the second lug grooves extend out from one side and the other side in the width direction (short direction) of the first inclined portions.

Thus, five grooves, these being two second inclined portions, the first lug groove, and the one side and the other side of the second lug groove, merge at each first inclined portion. By merging a large number of grooves at the first inclined portions in this manner, large snow columns are formed in the first inclined portions when running on snow. This enables the snow column shear force to be improved, as well as braking and acceleration performance on snow to be improved.

A pneumatic tire according to a second aspect of the present invention further includes third lug grooves that are formed on an opposite side of the first inclined portions from the first lug grooves, and that extend out from the first inclined portions.

In the pneumatic tire according to the second aspect, the third lug grooves also merge at the first inclined portions, such that even larger snow columns are formed in the first inclined portions, enabling the snow column shear force to be improved, as well as braking and acceleration performance on snow to be improved.

In a pneumatic tire according to a third aspect of the present invention, the third lug grooves each terminate inside a land portion, and recessed sipes are formed separately from the third lug grooves at positions extending from terminal ends of the third lug grooves.

In the pneumatic tire according to the third aspect, the recessed sipes are formed at positions extending from the terminal ends of the third lug grooves, enabling a sudden change in rigidity to be alleviated, and well balanced deformation of the land portions of the tread to be realized.

In a pneumatic tire according to a fourth aspect of the present invention, a pattern, formed by the zigzag circumferential direction groove, the first lug grooves, and the second lug grooves, is formed as a pair of patterns having line symmetry to each other about a tire equatorial plane, and the first lug grooves of one pattern and the second lug grooves of the other pattern merge with each other in a straight line shape so as to cross the tire equatorial plane.

Forming the patterns with line symmetry about the tire equatorial plane in this manner enables the snow column shear force to be further improved, as well as braking and acceleration performance on snow to be improved. Moreover, the first lug grooves of the one pattern and the second lug grooves of the other pattern merge with each other in straight line shapes, thereby enabling long straight line shaped lug grooves to be formed. This enables water drainage performance to be improved, and also lengthens the tire width direction edges, enabling braking and acceleration performance on snow to be improved.

In a pneumatic tire according to a fifth aspect of the present invention the first lug grooves have a narrower width than the second lug grooves.

In the pneumatic tire according to the fifth aspect, the continuous first lug grooves have a narrower width than the second lug grooves, thereby enabling tire rigidity in the vicinity of the tire equatorial plane to be maintained, and enabling running stability to be secured.

Advantageous Effects of Invention

As explained above, the pneumatic tire of the present invention improves the shear force of snow columns when running on snow to be improved, thereby enabling braking and acceleration performance on snow to be improved.

BRIEF DESCRIPTION OF DRAWINGS

FIG. 1 is an opened-out view of a tread of a pneumatic tire according to an exemplary embodiment.

DESCRIPTION OF EMBODIMENTS

Explanation follows regarding a pneumatic tire 10 according to a first exemplary embodiment of the present invention, with reference to the drawing. Note that the arrow W indicates a tire width direction, and the arrow S indicates a tire circumferential direction in the drawing. The single-dotted dashed line CL indicates a tire equatorial plane.

FIG. 1 illustrates a tread portion 16 of the pneumatic tire 10. Tire ground contact edges 16E of the tread portion 16 are the tire ground contact edges when the pneumatic tire 10 is fitted to a standard rim, as defined in the JATMA YEAR BOOK (2014 edition, Japan Automobile Tire Manufacturers Association standards), inflated to an internal pressure of 100% air pressure (maximum air pressure) corresponding to the maximum load capacity (load shown in bold in the internal pressure-load capacity correspondence table) for the applicable JATMA YEAR BOOK size/ply rating, and loaded to the maximum load capacity. In cases in which the location of use or manufacturing location falls under TRA standards or ETRTO standards, then the respective standards are adhered to.

The pneumatic tire 10 of the present exemplary embodiment is configured with a pattern that has left-right symmetry about the tire equatorial plane CL. Two circumferential direction main grooves 20, 40 are formed extending along the tire circumferential direction in the tread portion 16 of the pneumatic tire 10 of the present exemplary embodiment. The circumferential direction main grooves 20, 40 are formed on either side of the tire equatorial plane CL. A shoulder block row 18A is formed on a tire shoulder side of the circumferential direction main groove 20. A shoulder block row 18B is formed on a tire shoulder side of the circumferential direction main groove 40. The shoulder block rows 18A, 18B are respectively divided into plural blocks 18AB, 18BB arrayed along the tire circumferential direction by shoulder lug grooves 19A, 19B.

A zigzag circumferential direction groove 22 is formed between the circumferential direction main groove 20 and the tire equatorial plane CL. A pattern formed in a region between the circumferential direction main groove 20 and the tire equatorial plane CL is hereafter referred to as pattern A. First inclined portions 24 that are inclined with respect to the tire circumferential direction S, and second inclined portions 26 that are inclined in the opposite direction to the first inclined portions 24 with respect to the tire circumferential direction S, are alternately and continuously formed to form the zigzag circumferential direction groove 22. The first inclined portions 24 each have a wider groove width and a shorter length than the second inclined portions 26. A block row 28 is formed around the tire circumferential direction between the zigzag circumferential direction groove 22 and the circumferential direction main groove 20.

A first lug groove 30 merges with an end portion at the tire equatorial plane CL side of each first inclined portion 24. The first lug grooves 30 are inclined in the same direction as the first inclined portions 24 with respect to the tire circumferential direction S, and extend out toward the tire equatorial plane CL.

A second lug groove 32 that is inclined in the opposite direction to the first inclined portions 24 with respect to the tire circumferential direction S intersects each first inclined portion 24. One end of each second lug groove 32 is coupled to the circumferential direction main groove 20. A part of each second lug groove 32 that is further toward the circumferential direction main groove 20 side than the first inclined portions 24 configures an outside second lug groove 32A, and a part of the second lug groove 32 that is further toward the tire equatorial plane CL side than the first inclined portions 24 configures an inside second lug groove 32B. The block row 28 is divided into plural blocks 28A arrayed around the tire circumferential direction S by the outside second lug grooves 32A. The second lug grooves 32 each have a wider width at the circumferential direction main groove 20 side than at the tire equatorial plane CL side.

A third lug groove 34 is formed to an end portion of each first inclined portion 24 on the opposite side to the side where the first lug groove 30 merges. The third lug grooves 34 are inclined in the same direction as the first inclined portions 24 with respect to the tire circumferential direction. Each third lug groove 34 terminates inside the respective block 28A. Respective groove widths W1, W3 of the first lug groove 30 and the third lug groove 34 are narrower than a groove width W2 of the second lug grooves 32.

Two round sipes 36 are formed in each block 28A at positions extending from the respective third lug groove 34. The round sipes 36 are each formed as a circular shaped recess in plan view.

Pattern B, which is similar to pattern A, is formed between the circumferential direction main groove 40 and the tire equatorial plane CL. Pattern B is configured with line symmetry to pattern A about the tire equatorial plane CL, and is formed offset by half a pitch in the tire circumferential direction S with respect to pattern A. A zigzag circumferential direction groove 42, first inclined portions 44, second inclined portions 46, a block row 48, blocks 48A, first lug grooves 50, second lug grooves 52, inside second lug grooves 52B, outside second lug grooves 52A, third lug grooves 54, and round sipes 56 in Pattern B respectively correspond to the zigzag circumferential direction groove 22, the first inclined portions 24, the second inclined portions 26, the block row 28, the blocks 28A, the first lug grooves 30, the second lug grooves 32, the inside second lug grooves 32B, the outside second lug grooves 32A, the third lug grooves 34, and the round sipes 36 in Pattern A.

The first lug grooves 50 in pattern B are formed extending out from the respective second lug grooves 32 in pattern A. A single, continuous straight line shaped lug groove extending from the circumferential direction main groove 20 across the tire equatorial plane CL and terminating inside the respective block 48A is formed by each second lug groove 32 and the respective first lug groove 50, first inclined portion 44, and third lug groove 54. The first lug grooves 30 in pattern A are formed extending out from the respective second lug grooves 52 in pattern B. A single, continuous straight line shaped lug groove extending from the circumferential direction main groove 40 across the tire equatorial plane CL and terminating inside the respective block 28A is formed by each second lug groove 52 and the respective first lug groove 30, first inclined portion 24, and third lug groove 34.

A central block row 58 is formed between the zigzag circumferential direction groove 22 and the zigzag circumferential direction groove 42. The central block row 58 is divided into plural central blocks 58A arrayed around the circumferential direction by the inside second lug grooves 52B and the respective first lug grooves 30, and the inside second lug grooves 32B and the respective first lug grooves 50, alternately crossing the central block row 58. The central blocks 58A each have a triangular shape.

Plural sipes 28S are formed running parallel to the third lug groove 34 in each block 28A, and plural sipes 48S are formed running parallel to the third lug groove 54 in each block 48A. Plural sipes 58S are formed running parallel to the tire width direction W in each central block 58A. Plural sipes 19AS are formed running parallel to the shoulder lug grooves 19A in each block 18AB, and plural sipes 19BS are formed running parallel to the shoulder lug grooves 19B in each block 18BB. Note that the sipes 28S, 48S, 58S are omitted from illustration in some of the blocks in FIG. 1. The sipes 28S, 48S, 58S may either be what are referred to as open sipes that are in communication with the grooves surrounding the respective blocks 28A, blocks 48A, and central blocks 58A, or what are referred to as closed sipes that terminate inside the blocks. The sipes 28S, 48S, 58S may each have a straight line shape, or a zigzag shape.

Explanation follows regarding effects of the present exemplary embodiment.

In the tread portion 16 of the pneumatic tire 10 of the present exemplary embodiment, six grooves merge at each first inclined portion 24 (two of the second inclined portions 26 and the first lug groove 30, outside second lug groove 32A, inside second lug groove 32B, and third lug groove 34). Six grooves (two of the second inclined portions 46 and the first lug groove 50, outside second lug groove 52A, inside second lug groove 52B, and third lug groove 54) merge at each first inclined portion 44. Large columns of snow are thereby formed in the first inclined portions 24, 44 when running on snow. This enables the snow column shear force to be improved, as well as braking and acceleration performance on snow to be improved.

Note that, although the third lug grooves 34, 54 are formed in the present exemplary embodiment, the third lug grooves 34, 54 are not absolutely necessary, and a configuration may be applied in which five grooves merge at each first inclined portion 24, 48. By forming the third lug grooves 34, 54 as in the present exemplary embodiment, larger snow columns are formed in the first inclined portions 24, 44, enabling the snow column shear force to be improved, as well as braking and acceleration performance on snow to be improved. The third lug grooves 34, 54 terminate inside the respective blocks 28A, 48A, thereby enabling a reduction in the rigidity of the blocks 28A, 48A to be suppressed.

In the present exemplary embodiment, the patterns A, B are formed with line-symmetry about the tire equatorial plane CL; however, the patterns A, B do not necessarily need to be disposed in this manner. One pattern, this being either pattern A or B, may be applied.

In the present exemplary embodiment, the first lug grooves 50 in pattern B are formed extending out continuously from the respective second lug grooves 32 in pattern A, and the first lug grooves 30 in pattern A are formed extending out continuously from the respective second lug grooves 52 in pattern B; however, these grooves do not necessarily need to be formed continuously to each other. Forming the grooves continuously to each other as in the present exemplary embodiment enables the configuration of grooves with a long groove length so as to cross the tire equatorial plane CL from the respective circumferential direction main grooves 20, 40, enables water drainage performance to be improved, and also lengthens the tire width direction edges, enabling braking and acceleration performance on snow to be improved.

Although the round sipes 36, 56 are provided in the present exemplary embodiment, the round sipes 36, 56 are not absolutely necessary. The sipes are also not necessarily each formed in a round shape in plan view, and may be formed as a triangular shaped or a rectangular shaped recess in plan view. In the present exemplary embodiment, the round sipes 36 are formed on an extension of the third lug grooves 34 in the respective blocks 28A, and the round sipes 36 are formed on an extension of the third lug grooves 54 in the respective blocks 48A. This enables a sudden change in rigidity inside the blocks to be alleviated and well balanced block deformation to be realized.

Although the groove width of the first lug grooves 30, 50 is narrower than that of the second lug grooves 32, 52 in the present exemplary embodiment, they do not necessarily need to be formed in this manner. Making the groove width of the first lug grooves 30, 50 formed in positions close to the tire equatorial plane CL a narrower width as in the present exemplary embodiment enables the rigidity of land portions in positions close to the tire equatorial plane CL to be secured.

The disclosure of Japanese Patent Application No. 2014-082095, filed on Apr. 11, 2014, is incorporated in its entirety by reference herein.

All publications, patent applications and technical standards mentioned in the present specification are incorporated by reference in the present specification to the same extent as if the individual publication, patent application, or technical standard was specifically and individually indicated to be incorporated by reference.

The invention claimed is:

1. A pneumatic tire comprising:
a zigzag circumferential direction groove that is formed in a tread portion by alternating and continuously formed first inclined portions and second inclined portions, the first inclined portions being inclined with respect to a tire circumferential direction and the second inclined portions being inclined in an opposite direction to the first inclined portions with respect to the tire circumferential direction;
first lug grooves that are inclined in the same direction as the first inclined portions with respect to the tire circumferential direction and that merge with the first inclined portions;
second lug grooves that are inclined in the opposite direction to the first inclined portions with respect to the tire circumferential direction and that intersect the first inclined portions, wherein angles of the second lug grooves with respect to the tire circumferential direction are greater than angles of the second inclined portions with respect to the tire circumferential direction;
third lug grooves that are formed on an opposite side of the first inclined portions from the first lug grooves, and that extend out from the first inclined portions,
wherein the third lug grooves extend in a same direction as the first lug grooves.

2. The pneumatic tire of claim 1, wherein the first inclined portions are wider than the second inclined portions, and the first inclined portions are shorter than the second inclined portions.

3. The pneumatic tire of claim 1, wherein the second lug grooves at a circumferential direction main groove side are wider than at a tire equatorial plane side.

4. The pneumatic tire of claim 1, wherein five block rows that extend in the tire circumferential direction are formed in a tire width direction, a side of a block of the central block row is formed straddling an equatorial plane and is formed from second lug grooves on a first side of the equatorial plane and the first lug grooves and the first inclined portions on a second side of the equatorial plane, with the the first lug grooves having the smallest width.

5. The pneumatic tire of claim 1, wherein the second lug grooves are wider than the third lug grooves.

6. A pneumatic tire comprising:
a zigzag circumferential direction groove that is formed in a tread portion by alternating and continuously formed first inclined portions and second inclined portions, the first inclined portions being inclined with respect to a tire circumferential direction and the second inclined portions being inclined in an opposite direction to the first inclined portions with respect to the tire circumferential direction;

first lug grooves that are inclined in the same direction as the first inclined portions with respect to the tire circumferential direction and that merge with the first inclined portions, the second inclined portions being wider than the first lug grooves;

second lug grooves that are inclined in the opposite direction to the first inclined portions with respect to the tire circumferential direction and that intersect the first inclined portions, wherein:
the second lug grooves are wider than the first lug grooves,
the second lug grooves include an outside second lug groove and an inside second lug groove that are inclined in a same direction along a straight line, and
the outside second lug grooves and the inside second lug grooves both directly merge with the first inclined portions;

third lug grooves that are formed on an opposite side of the first inclined portions from the first lug grooves, and that extend out from the first inclined portions, the third lug grooves being wider than the first lug grooves; and
the third lug grooves extend in a same direction as the first lug grooves.

7. The pneumatic tire of claim 6, wherein:
the third lug grooves each terminate inside a land portion; and
recessed sipes are formed separately from the third lug grooves at positions extending from terminal ends of the third lug grooves.

8. The pneumatic tire of claim 7, wherein two recessed sipes are formed at positions extending from every third lug groove.

9. The pneumatic tire of claim 7, wherein the outside second lug grooves have a zigzag edge and the inside second lug grooves have a linear shape.

10. The pneumatic tire of claim 6, wherein:
a pattern, formed by the zigzag circumferential direction groove, the first lug grooves, and the second lug grooves, is formed as a pair of patterns having line symmetry to each other about a tire equatorial plane; and
the first lug grooves of one pattern and the second lug grooves of the other pattern merge with each other in a straight line shape so as to cross the tire equatorial plane.

11. The pneumatic tire of claim 6, wherein the first inclined portions are wider than the second inclined portions, and the first inclined portions are shorter than the second inclined portions.

12. The pneumatic tire of claim 6, wherein the second lug grooves at a circumferential direction main groove side are wider than at a tire equatorial plane side.

13. The pneumatic tire of claim 6, wherein five block rows that extend in the tire circumferential direction are formed in a tire width direction, a side of a block of the central block row is formed straddling an equatorial plane and is formed from inside second lug grooves on a first side of the equatorial plane and the first lug grooves and the first inclined portions on a second side of the equatorial plane, with the the first lug grooves having the smallest width.

14. The pneumatic tire of claim 6, wherein the second lug grooves are wider than the third lug grooves.

* * * * *